United States Patent [19]
Candy

[11] Patent Number: 5,412,404
[45] Date of Patent: May 2, 1995

[54] VIDEO GRAPHICS APPARATUS

[76] Inventor: Gerald W. Candy, 2 Freelands Duncan Road Park Gate, Southampton S03 7BD, United Kingdom

[21] Appl. No.: 1

[22] Filed: Jan. 22, 1993

[30] Foreign Application Priority Data

Jul. 16, 1992 [GB] United Kingdom ............ 9215122

[51] Int. Cl.6 .............................................. G09G 5/00
[52] U.S. Cl. ................................ 345/211; 348/173
[58] Field of Search ............ 340/720, 723, 799, 798, 340/750; 358/220; 273/148 B, 85 G, DIG. 28; 345/11, 185, 190, 211, 117, 10; 348/173

[56] References Cited

U.S. PATENT DOCUMENTS

| | | | |
|---|---|---|---|
| 4,300,204 | 11/1981 | Maeda et al. | 364/705 |
| 4,338,623 | 7/1982 | Asmus et al. | 358/220 |
| 4,722,005 | 1/1988 | Ledenbach | 358/220 |
| 4,777,484 | 10/1988 | Sakurai | 345/117 |
| 4,922,420 | 5/1990 | Nakagawa et al. | 364/410 |
| 5,033,085 | 7/1991 | Rew | 345/117 |
| 5,059,961 | 10/1991 | Cheng | 340/720 |
| 5,105,189 | 4/1992 | Murai et al. | 340/825 |

FOREIGN PATENT DOCUMENTS

| | | |
|---|---|---|
| 3048393A1 | of 0000 | Germany . |
| 2083936A | of 0000 | United Kingdom . |
| 2086115A | of 0000 | United Kingdom . |
| 2091069A | of 0000 | United Kingdom . |
| 2106685A | of 0000 | United Kingdom . |
| 2141907A | of 0000 | United Kingdom . |
| 2193868A | of 0000 | United Kingdom . |
| 2253325A | of 0000 | United Kingdom . |
| WO8203318 | of 0000 | WIPO . |
| WO9214526 | of 0000 | WIPO . |

OTHER PUBLICATIONS

<<After Dark>> by Berkeley Systems 1990. Pp. 5-6 and 10.

Primary Examiner—Richard Hjerpe
Assistant Examiner—Lun-Yi Lao
Attorney, Agent, or Firm—Fay, Sharpe, Beall, Fagan, Minnich & McKee

[57] ABSTRACT

A video graphics generator 30 is provided for a video system such as an amusement machine which includes a video display device 18, user operable input devices 14, 16, 17 and a system controller 20 which is responsive to the user input devices and outputs video signals for driving the display device. The video graphics generator comprises a control unit responsive to an absence of operation of the user input means for a predetermined length of time to interrupt the video signals output by the system controller for at least a predetermined interval and to substitute alternative video signals for display on the video display device. An intermediate connector 27 for a standard interface between the system controller other elements of the video system can be used to sense signals for determining when to interrupt the normal video signals from the system controller.

11 Claims, 4 Drawing Sheets

VIDEO GRAPHICS APPARATUS

BACKGROUND OF THE INVENTION

1. Field of the Invention

This invention relates to video graphics apparatus suitable for use with a video system which includes a video display device, user operable input means and a system controller which is responsive to the user operable input means and outputs video signals for driving the display device.

2. Description of the Prior Art

Video systems such as amusement machines for video arcade games normally have two modes of operation. In one mode of operation the amusement machine is operable to play a game on payment of an appropriate amount by a user. The amusement machine is normally provided with a number of switches, levers, joysticks, track balls and the like to enable a user to interact with the machine. Activation of this, play, mode is normally in response to the user inserting money or tokens into a coin or token mechanism. The play mode continues until the game has finished and/or the playtime bought by the user has run out. On termination of the play mode, the amusement machine will revert to a default, or attract, mode. In the attract mode, the amusement machine normally displays pictures which will attract the user to use the machine: hence the term 'attract' mode. Typically, an amusement machine spends most of its time in the attract mode waiting for a customer.

A modern amusement machine, such as a video arcade game, is an expensive piece of equipment and it is undesirable that such a piece of equipment should spend a large percentage of its time not earning money for its owner and operator.

It has been proposed to display advertisements on the video display device of amusement machines during the attract mode of operation of the amusement machines. The following patent documents disclose amusements machines providing such a facility: GB-A-2,141,907; DE-A-3,048,393; WO-A-82/03,318; GB-A-2,091,069 and GB-A-2,083,936. These documents describe the generation of advertisements using various storage media, such as video tape recorders and solid state memories. Typically, the display of an attract mode is suppressed for the display of advertisements. However, none of these prior art documents consider the problem of providing video graphics apparatus which is adapted to be provided as an add-on for existing amusement machines. In particular none of the prior art documents consider the problems of providing such add-on apparatus which is suitable for use with a range of different machines installed or to be operated at customer sites.

My co-pending British patent application GB 9103936.2, filed 26 Feb. 1991, which is now a GB patent No. 2253325, published on Sep. 2, 1992, and the corresponding co-pending International application PCT/GB92/00344, filed 26 Feb. 1992, which is now a world patent No. WO9214526, published on Sep. 3, 1992, relate to examples of video graphics generators which are adapted to be provided as an add-on for existing video systems such as amusement machines. The subject matter of these applications is herein incorporated by reference.

SUMMARY OF THE INVENTION

An object of the present invention is to provide improvements to the invention described in the aforementioned co-pending applications.

In accordance with a first aspect of the present invention, there is provided a video graphics apparatus for a video system which includes a video display device, user operable input devices and a system controller which is responsive to said user operable input devices and outputs video image signals for driving said display device, said apparatus comprising:
  sensing means connectable to said video system for detecting whether said user operable input devices are being operated; and
  control means connected to said sensing means and responsive to an absence of operation of said user operable input devices for a predetermined length of time to interrupt said video image signals output by said system controller for at least a predetermined interval to substitute alternative image signals for display on said video display device.

By detecting user inactivity, as represented by the user not operating the user operable means (which may be keys, buttons, joysticks and the like) for a predetermined length of time (e.g. 20 seconds) a simple method is provided for testing whether the normal display of video signals can be interrupted to display advertisements. The sense means can, for example, test the potential on the non-grounded side of a switch or joystick controller to establish whether the user input device is being operated. This basic approach can be used readily for a very wide range of amusement machines whereas testing for an attract mode is complicated in that different machine operating states will be characteristic of an attract mode in different machines.

Preferably, said control means is responsive to operation of said user operable input means during said predetermined interval to terminate said display of said alternative signals for resuming said display of said video image signals from said system controller. In this way, if the display of an advertisement were to occur during an active mode of the amusement machine where the user does not use the controls for the predetermined length of time, the game can simply be resumed.

Where said video system is an amusement machine having a first, attract mode and a second, play mode, said control means is preferably responsive to at least one signal representative of said amusement machine being in said attract mode whereby interruption of said video image signals of said system controller by said alternative image signals is restricted to said attract mode of operation of said amusement machine.

One of the difficulties in connecting a video controller as an add-on to an existing machine is that permanent changes to the existing machine cannot be made as this could invalidate warranties. An object of the invention is to avoid such problems.

The invention also provides a video graphics apparatus for a video system which includes a video display device, user operable input devices, a system controller which is responsive to said user operable input devices and outputs video image signals for driving said display device, first multiple signal path connector means connected to said control means and second multiple signal path connector means connected to said video display device and to said user operable input devices, said first multiple signal path connector means and said second multiple signal path connector means being realeasable connectable to one another, wherein said apparatus comprises:

a multiple signal path intermediate connector means for connecting respective paths of said first and second connector means;

sensing means including at least one signal line for sensing signals on a signal path of said intermediate connector means; and control means responsive to said sensing means selectively to interrupt said video image signals output by said system controller for at least a predetermined interval to substitute alternative image signals for display on said video display device.

This aspect of the invention recognises that the trend towards standardising the interfaces between the system controllers for video games and user input devices and display devices provides an entry point for sampling the signals passing to and from the system controller. Typically the system controllers are provided on one or more circuit boards which are provided with a standard connector interface. The user input devices, the display means, power supplies etc. are the linked to the system controller by a cooperating connector. One example of such a standard interface is the JAMMA connector.

The invention also proposes that a video system including a video display device, user operable input devices and a system controller which is responsive to the user operable input devices and outputs video image signals for driving the display device should generate an enabling signal which indicates phases of operation when a video graphics apparatus may interrupt the normal video signals output by the system controller. Such a period may be the attract mode of an amusement machine. In such a case said video generator apparatus should comprise sensing means releasably connectable to said video system for detecting, in use, an enabling signal from said system controller and control means connected to said sensing means and responsive to receipt of an enabling signal to interrupt said video image signals output by said system controller for at least a predetermined interval to substitute alternative image signals for display on said video display device.

The invention provides a combination of a video amusement machine including a video display device, user operable input devices and a system controller which is responsive to said user operable input devices, is operable to output video image signals for driving said display device in a first, attract mode and a second, play, mode, and is provided with a signal output for indicating said operating mode of the video amusement machine, and video graphics apparatus as defined above to be removably installed in said video amusement machine. The invention also provides a video amusement machine for use in the combination.

One of the difficulties when many examples of video graphics apparatus are installed in video systems at operator sites is the updating of the screens of video graphics information. The operator of the machine may wish different advertisements to be displayed at different sites. For example, it may be desired to display different local advertisements in different localities. If a lot of machines are in use in one location, then it may be desired for each machine to show different advertisements. Also, it may well be desired to change the advertisements at frequent intervals.

Accordingly, said control means preferably comprises re-writable solid state memory such as a flash-PROM or electrically erasable PROM (EEPROM) for the storage of a plurality of screens of video graphics data, and control logic for selecting a screen of video graphics data from storage for generating the alternative video signals for display.

Preferably each video graphics apparatus includes unique identifier means uniquely identifying a particular apparatus. This is of advantage, for example, in updating the video graphics screens stored in the video graphics apparatus if the video graphics apparatus with a unique identifier is combined with programming means including means for storing a plurality of screens of video graphics data where the video graphics apparatus and the programming means are provided with mutually cooperating transmission means for permitting the transfer of data from the programming means to the video graphics generator. By providing the programming means with means for determining the identity of the apparatus using the unique identifier means and means responsive to the identity determination for transmitting selected screens of video graphics data to the apparatus automatic updating of the video graphics screens can be achieved with a minimum of work for the person charged with performing the updating. In a preferred embodiment the programming means is a portable unit such as a lap-top computer.

In accordance with a further aspect of the invention there is provided a method of updating said video graphics images in video graphics apparatus using programming means where said video graphics apparatus and said programming means are provided with mutually cooperating transmission means for permitting said transfer of data from said programming means to said video graphics apparatus, said method comprising:

said programming means determining said identity of said apparatus using said unique identifier means; and said programming device transmitting selected screens of video graphics data to said apparatus in accordance with said identity of that apparatus.

Preferably the programming means is arranged to record successful completion of the transfer of the screens of data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
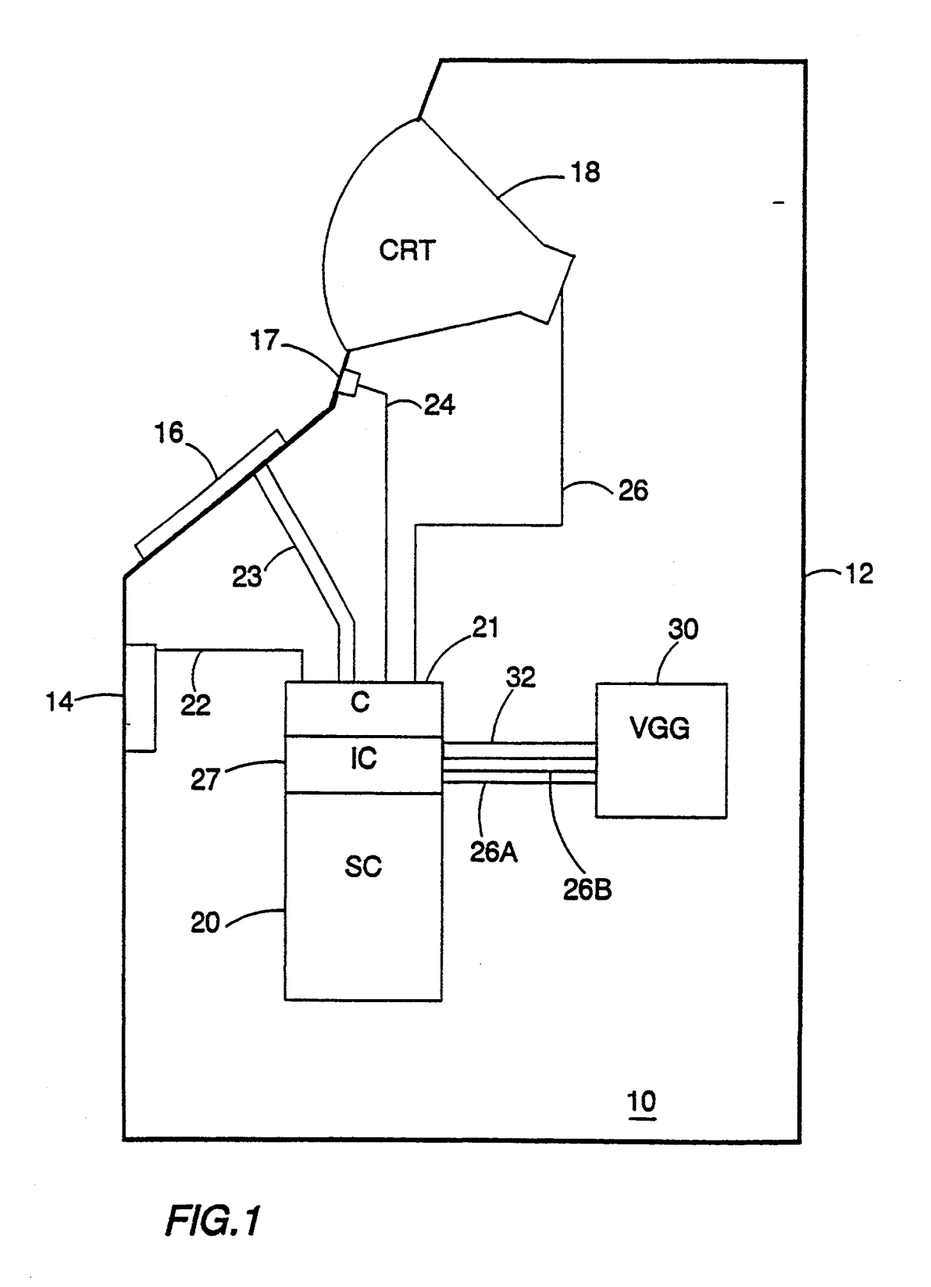
FIG. 1 is a schematic diagram of an amusement machine incorporating a video graphics generator.

FIG. 1 is a schematic diagram of an amusement machine 10 to which a video graphics generator 30 has been added. The conventional amusement machine comprises a housing 12 with, accessible to a user externally to the machine, a coin, token, or other payment mechanism 14 and various game controls 16, which can include one or more of the following: switches, levers, joysticks, trackballs and the like. A system controller 20 is connected to the payment mechanism 14 and to the user operable controls 16 by control connections 22 and 23, respectively. Each of the connections 22 and 23 can comprise one or more lines as appropriate. At least one output from the system controller 20 is in the form of a video signal which is passed via a video connection 26 to a video display device 18 (eg. a cathode ray tube with associated circuitry). Also shown is a connection 24 from the system controller 20 to an indicator light 17. It will be appreciated that a typical amusement machine has many such indicator lights, although these are not shown here for reason of clarity. Other connections, to further indicator or control lights and to an audio system, for example, can be provided. In addition, a power supply, normally connected to a mains electricity supply, and appropriate wiring will be provided. These additional elements, which can be conventional, are not shown for reasons of clarity.

The system controller in FIG. 1 is carried by a printed circuit board which is provided at one edge with a connector having a plurality of contacts defining signal paths. Typically the contacts are provided on the upper and lower surfaces of the printed circuit board. The various lines 22, 23 and 24, and also the video output 26, the power supply connections and so on would normally be connected to the system controller 20 on the printed circuit board by means of a connector 21 designed to cooperate with the contacts on the edge of the printed circuit board. The order of connection of the various lines to the connector 21 typically follows one of a limited number of standards. The most widely used standard is currently the JAMMA standard. This means that different system controllers for different games could be plugged into one housing with one set of user operable controls. Thus, for example, when a new game, or a new version of an existing game is available, the new game/game version can be made available simply by plugging in the new system controller card.

The video graphics generator 30 is a feature not present in conventional video based amusement machines. The video graphics generator 30 is inserted in the video connection 26 between the system controller and the video display device 18. In the preferred embodiment this is achieved by means of an intermediate connector "IC", 27, which is inserted between the system controller 20 and the connecter 21. Thus, a first connection 26A connects the video output of the system controller 20 to a video input of the video graphics generator 30. A second connection 26B connects the video graphics generator to connector 21 and from there, via the video connection 26, to the cathode ray tube 18. In addition, the intermediate connector 27 is also a feature not present in existing video based amusement machines or video graphics generators. The intermediate connector will be described in more detail later with reference to FIG. 3.

Figure 2:
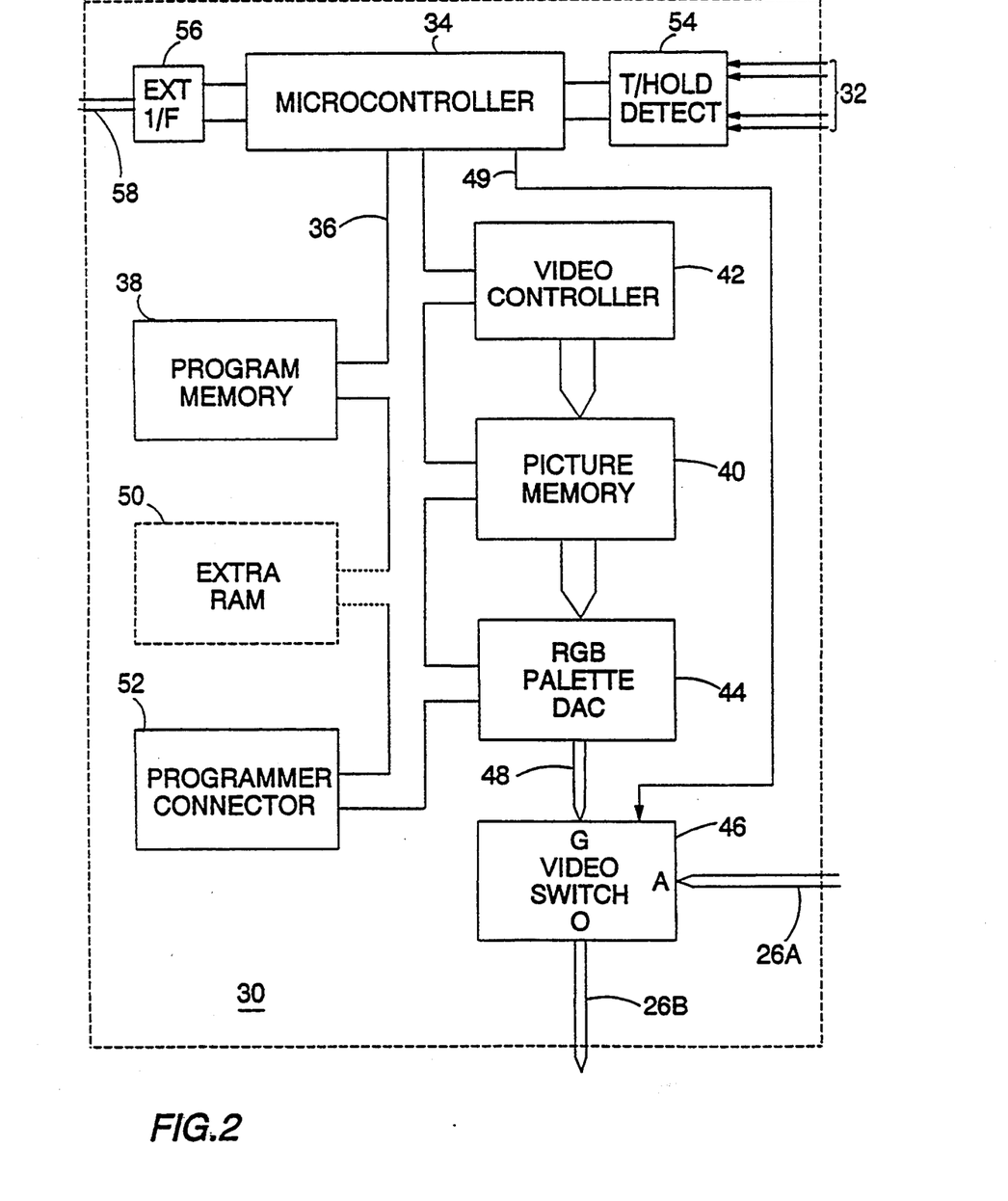
FIG. 2 is a schematic block diagram of the video graphics generator of FIG. 1.

FIG. 2 is a schematic block diagram of a video graphics generator 30. The video graphics generator 30 is microcontroller based. A microcontroller 34 is connected to a number of other system units via a computer bus 36. Connected to the microcontroller 34 via this bus 36 are a read only program memory 38 for the storage of control programs, an E-PROM (erasable programmable read only memory) array 40 (e.g. of flash E-PROM or electrically erasable (EEPROM) memory chips) forming a picture memory for the storage of a plurality of screens of video graphics data, a video controller 42 for controlling the reading of graphics data from, and the writing of graphics data to the picture memory 40, an RGB palette DAC (digital to analogue converter) 44 and an external programmer connector 52.

The microcontroller 34 contains its own internal working random access memory (RAM). However, provision is made for the optional addition of extra RAM 50 to the computer bus 36. The data output from the array of E-PROMs 40 is connected to the RGB palette DAC 44, which converts the digital graphics data from the picture memory into colour signals. The output of the RGB palette DAC 44 is connected to one input, G, of a video switch 46 via a video connector line 48. The video output of the system controller 20 is connected via the video connection 26A to the second input A of the video switch 46. The output O of the video switch 46 is connected to the video connection 26B to the connector 21 and from there, via the video connection 26, to the cathode ray tube 18. The video switch is connected via control lines 49 to the microcontroller 34. In order to that the video graphics generator should not adversely affect the reliability of the amusement machine, the video switch 46 is arranged to have a default state in which the video output of the system controller 20 is passed to the cathode ray tube 18. Thus, if the video graphics generator fails, then the amusement machine still operates.

The microcontroller 34 is linked via threshold detectors 54 to sense lines 32 for sensing signal levels on signal paths in the intermediate connector 27 when connected in series between the system controller printed circuit board and the connector 21.

It should be noted that in the present embodiment the microcontroller is responsive to simple threshold detectors. However, more complex detection circuitry could be provided if required depending on the type of signals to be detected. For example, if it is desired to permit the interruption of the normal video output of the system controller only during an attract mode, it may be necessary to detect audio or visual clues to this. For example, it may be necessary in some video amusement machines to detect the generation of a particular sound output by the machine. In this case a circuit may be provided to convert audio sounds to digital signals which are then analyzed by the microcontroller. It may be necessary to detect the illumination of a particular lamp. This could be achieved by means of an optical sensor for producing a signal which is analyzed by the microcontroller.

In the preferred embodiment of the invention the non-operation of the user input means is, however, detected as this can be applied to a whole range of machines by simply sensing the voltages on appropriate standard signal paths through the connectors of a large range of machines.

Also shown in FIG. 2 is external interface circuitry 56 which can be used for reprogramming the microcontroller 34 via an external serial or parallel port 58.

The programmer connector 52, is used for connecting a programmer device (preferably a portable computer—not shown) for programming the picture memory 42, which, as mentioned above, is used to hold a plurality of screens of graphics data. In one embodiment eight screens are stored. However, by using a larger picture memory more screens (e.g. 16) could be stored.

When it is intended to programme the picture memory, the portable computer is plugged into the programmer connector 52. In the present embodiment of the invention the programmer connector 52 is an electrical socket, the programmer having a co-operating plug. However, the socket could be provided on the programmer device and the plug on the video graphics generator 30. An optical link could alternatively be provided in other embodiments. The video graphics generator is provided with means for storing an identifier (ID) which is unique to each unit. This is stored in non rewritable memory (e.g. in a read-only register) or by means of a separate hardware device. The ID is used in connection with the programming operations which are described later.

Figure 3:
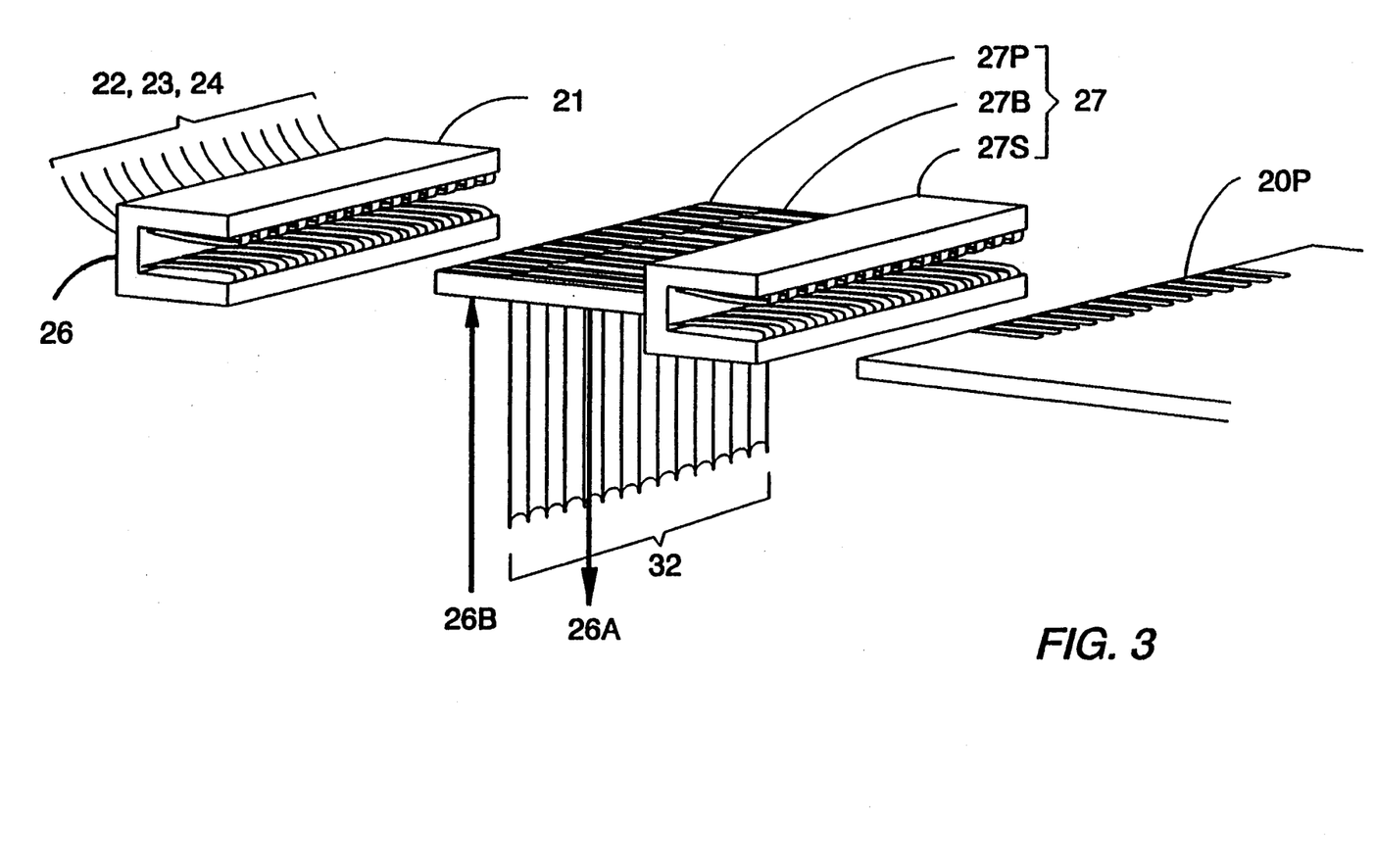
FIG. 3 is a schematic diagram of a connector arrangement for an example of the invention.

FIG. 3 illustrates an example of intermediate connector 27 which is intended to be removably connected between the system controller printed circuit board 20 and the connector 21. It will be seen that the system controller printed circuit board 20 is provided along one edge with a plurality of contacts 20P. The contacts 20P provide signals paths for respective signals and for supply voltages, etc. The connector 21 is a socket which is connected to the lines 22, 23, 24, 26 etc. of the amusement machine. In normal use without a video graphics generator 30, the edge of the printed circuit board with the contacts 20P would be inserted into the connector 21 to make connection between respective contacts to establish the various signal paths. The edge of the printed circuit board with the contacts 20P and the connector 21 can, for example, be configured in accordance with the JAMMA standard.

For use with a video graphics generator, the intermediate connector 27 is provided with a printed circuit board connector 27B having on one edge a plurality of contacts 27P comparable to the contacts 20P and a connector 27S comparable to the connector 21. Corresponding contacts 27P on the board 27B and in the connector 27S are electrically interconnected to define respective signal paths. The video connection 26A to the video graphics generator 30 is connected to the video input of the socket 27S. The video connection from the video graphics generator 26B is connected to a contact at a corresponding position on the contacts 27P for connection, via the connector 21, to the video connection 26. In this way the video connection from the system controller 20 to the display device 18 is channelled via the video switch in the video graphics generator 30. Also connected to at least selected signal paths between the contact on the board 27B and the connector 27S are a plurality of sense lines which together form a ribbon cable 32. The sense lines in the ribbon cable are connected to the threshold circuits in the video graphics generator 30 for determining the signals on the signal paths. Not all of the signal paths need to be sensed.

In one preferred embodiment of the invention, where the interruption of the normal display of video signals from the system controller is enabled when no user input for a predetermined length of time is detected, the signal lines from each of the user operable input devices to the system controller are sensed. Typically, in accordance with the JAMMA standard, a +5 volt signal on the lines (i.e. on the non-grounded side of the switches, etc.) is indicative that the user input device is not currently being operated, whereas a 0 volt signal is indicative that it is. Accordingly simple threshold sense means can detect operation, or not, of a user operable input device.

In other examples of the invention, where, for example it is desired to only permit interruption of the video signals from the system controller during an attract mode of the amusement machine, other signal lines could be sensed. For example, the operating states of the payment mechanism 14 and/or the game controls 16 and/or an indicator light 17 could be sensed.

Figure 4:
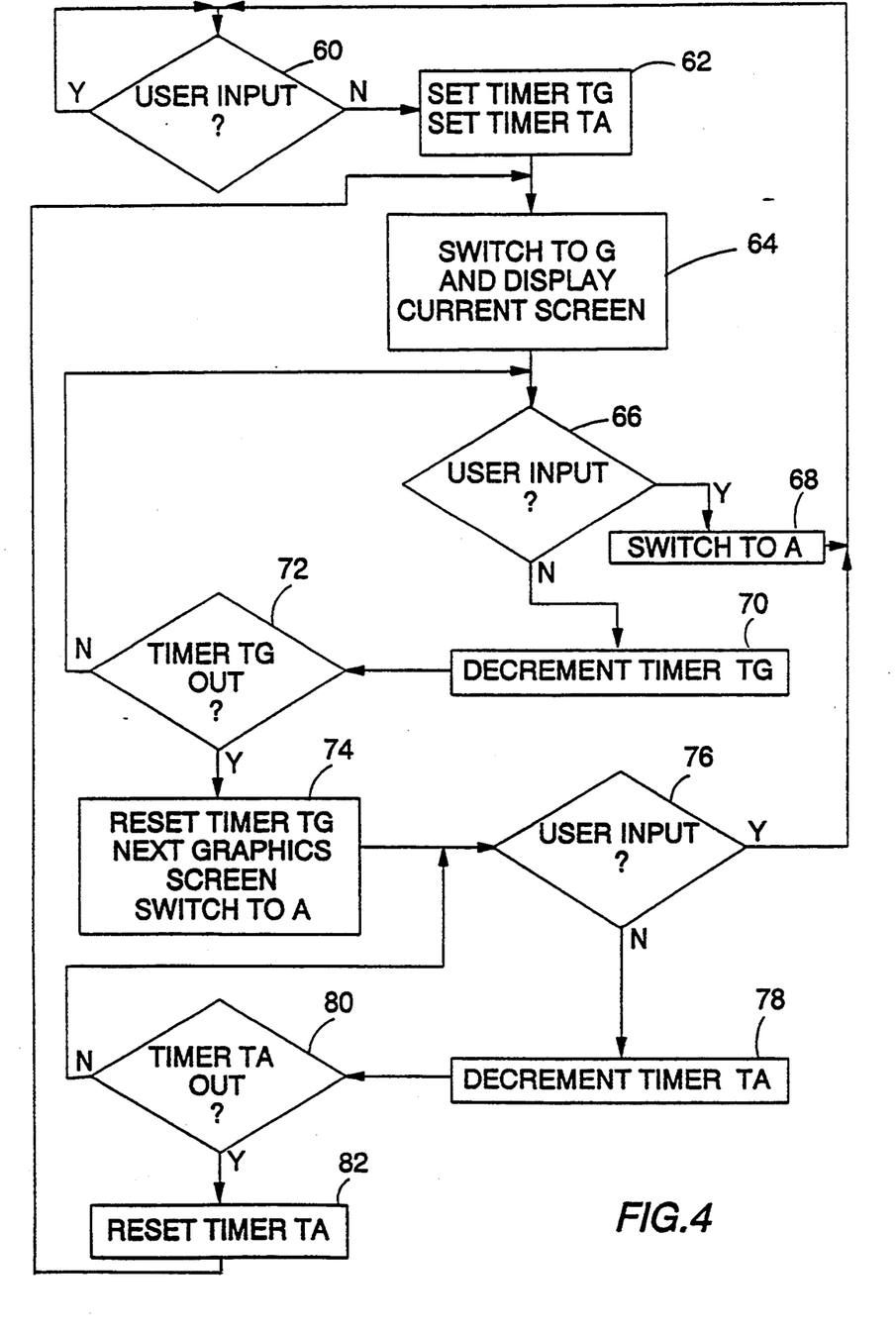
FIG. 4 is a flow diagram illustrating the operation of control logic for the video graphics generator of FIG. 2.

FIG. 4 illustrates the operation of the video graphics generator under control of control logic stored in the ROM 38 in for one example of the invention in which a test is made whether a user input has been made within a predetermined length of time. The amusement machine 10 is operable in two different modes. The default mode, or attract mode, is one in which the system controller of the amusement machine generates video information for display on the cathode ray tube 18 which is intended to attract a customer to use the amusement machine 10. Typically, in an attract mode, no user input will occur. In a second, play mode, which is operable after actuation of the payment mechanism 14, the user operates the user operable devices 16 to interact with programs in the system controller 20 to play a game. Typically in a play mode the user will be operating the user operable input devices frequently.

The primary intention of the video graphics generator is to interrupt the attract mode for the display of alternative video data in the form of graphics screens. During active play, the play mode should not normally be interrupted. In view of the use pattern of the user operable input devices, a simple technique for sensing when the normal display mode of the amusement machine may be interrupted is to detect when the user operable input devices have not been operated for a predetermined length of time. The alternative graphics screens can take the form of advertisements for products or services.

FIG. 4 illustrates the operation of control logic of the video graphics generator 30, the control logic being stored in the ROM 38.

The control logic 60 tests whether a user input device has been operated within a predetermined length of time by sensing the signal levels on the appropriate signal lines. This test is made repeatedly until the an inactive period of at least the predetermined length is detected. When the inactive period is sensed, the control logic 62 sets a first timer, TG, and a second timer, TA. The control logic 64 then causes the video switch to connect input G to output O. A current screen of video graphics data can then be passed via the connection 48 via the video switch 46 and the video connections 26B and 26 to the video display device 18. The screen of video graphics data to be displayed is determined by addresses supplied via the bus 36 using the pointer maintained by the microcontroller 34.

If the control logic 66 detects that a user operable input device has been operated, the control logic 68 switches the video switch back so that the input A is connected to the output O. At this point, the screen of graphics data from the picture memory 40 ceases to be displayed, being replaced by the output from the system controller 20.

If the control logic 66 does not detect a new user input operation, the control logic 70 decrements the timer TG and then the control logic 72 test whether the timer TG has timed out. If the control logic 72 determines that the timer TG has not counted out yet, then control reverts to the control logic 66. If the control logic 72 determines that the timer TG has timed, or counted out, this indicates that the current screen or video graphics data has been displayed for the desired length of time. In this case, the control logic 74 resets the timer TG and causes the pointer to the current graphics screen to be updated to point to the next graphics screen within the picture memory 40. The control logic 74 operates in such a manner that the video graphics generator cycles repeatedly through the screens of video graphics data stored therein. The control logic 74 then causes the video switch to switch the input A to the output O causing the display of data from the system controller 20 on the video connection 26A to be displayed on the video display device 18 via video connections 26B and 26.

The control logic 76 then tests whether a new user input operation has occurred. If this is the case, then control returns to the control logic 60. If no user input operation is detected, however, the control logic 78 decrements the timer TA and then the control logic 80 tests whether the timer TA has counted out. If the timer TA has not counted out, then control returns to the control logic 76. If the control logic 80 determines that the timer TA has counted out, indicating that the system controller video output has been displayed for a desired period, then the control logic 82 resets timer TA and control passes back to the control logic 64.

Thus, it can be seen that the timers TG and TA, which are preferably implemented as counters, enable different periods to be set for the display of the video graphics screens, and the system controller video output, respectively by setting appropriate initial counts in the respective counters.

In view of the pattern of user input device operation associated with attract and play modes, only the attract mode will normally be interrupted. It is possible that the user operable input means might be operated during an attract mode, for example by a user trying out the user input devices. However, the effect of this will merely be to suppress or cancel the display of advertisements while the user is operating the input devices. It is also possible during a play mode that an advertisement will be displayed if a user does not operate a user input device for a long period. However, this can be avoided for virtually all normal situations by an appropriate choice of the delay period before an interruption can occur. Accordingly, the delay period is preferably programmable. Despite this, if the display of an advertisement were to occur, as a result of the frequent sampling of the signals from the user input devices any activation of those devices would immediately suppress the display of the advertisement and the resumption of the game.

The programming of the video graphics generator is preferably performed through the agency of a portable personal computer. The use of a personal portable computer with a disc drive enables a relatively large number of screens of video graphics data to be made available. Through appropriate programming of the personal computer it is also possible to facilitate the programming in a flexible manner of a plurality of video graphics generators at operator locations. In particular, the personal computer can be preprogrammed to load specific sets of screens of video graphics data into specific video graphics generators to which it is connected.

The operation of programming using a portable computer can be summarised as follows. On insertion of the plug of the programmer device into the socket 52, which is preferably provided in the form of a standard parallel computer port, the microcontroller senses that the video graphics generator is to be programmed. This causes the microcontroller to activate a programming mode. It also causes the personal computer to activate a programming mode. The programming operations performed by the personal computer (PC) include the following steps:

(1) access the video graphics generator ID;
(2) compare ID to preprogrammed tables in PC memory to identify screens of video graphics data to be transmitted to the video graphics generator;
(3) transmit screens in required sequence from PC memory to video graphics generator; and
(4) verify correct transmission and record details of transmission such as date, time, screens transmitted, etc.

The data transmitted from the PC can be loaded into the EEPROM in a conventional manner as will be understood by one skilled in the art under the control of the PC and/or the video controller 42. The video graphics data for respective screens are stored at respective sets of locations within the EEPROM 42. The microcontroller maintains a pointer to a current video graphics screen for display. This operation, which is conventional in nature, is not be described further herein. On completion of the programming operation, the PC is disconnected from the video graphics generator 30.

Easy access to the connector 52 for programming the picture memory 40 by means of a portable programming device can be provided. Ideally this is arranged by situating the video graphics generator at a position within the amusement machine, close to the payment mechanism. Then a service engineer, when visiting to empty the payment mechanism of any coins, can re-program the picture memory 40. Although the invention could be used on may different video system, such as sports ground score boards, bowling alley scoring systems and the like, it is particularly suitable for use in an amusement machine having an attract mode, a play mode and a play selection means. In use in an amusement machine, it enables the usual attract mode of such an amusement machine to be interrupted to permit the display of alternative video signals to those normally produced during the attract mode. These alternative video signals can be video signals forming one or more screens of one or more advertisements for products and/or services with the result that it is possible for the owner and/or operator of the machine to get royalties for the display of those advertisements.

The invention is particularly adapted to form an add-on unit for an existing amusement machine. Accordingly, it is preferably provided in a housing (not shown) having attachment means (not shown) for attaching the video graphics generator at an appropriate position within the amusement machine.

Although a specific embodiment of the invention has been described, it will be appreciated that many additions and modifications are possible.

For example, although in the preferred embodiment, the video graphics generator is provided as an add-on unit for an existing amusement machine, it could be incorporated in a new amusement machine from the outset.

An embodiment is described above for use with one type of connector. It will be appreciated that other forms of connectors could be used as required depending on the amusement machine or other video system with which the invention is to be used. However, in order to avoid invalidating the warranty of an existing machine to which the video graphics controller is to be added, permanent connections should be avoided. Accordingly, the video graphics generator should be releasably connected to the video system and is ideally provided with appropriate connector plugs and/or sockets for providing easy connection of the video graphics generator into the video connection 26.

Also, although particular examples of signals to be sensed are described above, other signals may be sensed in specific cases. For example, if a video system which is operable in a mode when interruptions of the video signals from the system controller is acceptable and another mode when it is not acceptable and the video system provides a specific enabling signal identifying whether or not the video signals from the system controller may be interrupted, then the video graphics generator need only sense this one signal.

Although, in the present embodiment an EEPROM, or flash E-PROM is used for the storage of the screens of video graphics data, other sorts of re-programmable memory could be used. For example, a conventional RAM could be used, although in this case a battery back-up would be desirable to avoid the screens of video graphics data being erased if the power supply is interrupted.

Instead of a portable programming device, re-programming could be achieved remotely via a telephone or a radio connection or the like.

With the provision of a more complicated video switch, the alternative video graphic images could be displayed over a part of the screens from the attract mode, rather than replacing them altogether. Alternatively, a plurality of screens of graphics data could be displayed on each interruption of the attract mode, the plurality of screens being shown one after the other or simultaneously (e.g. at different screen positions).

The video graphics generator could additionally be provided with means for interrupting the audio output of the amusement machine. Thus, in the case of an advertisement, when a video graphics screen is displayed on the display device, this could be accompanied by the playing of a current jingle used in a corresponding television advertising campaign.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Video graphics apparatus for attachment to or incorporation in a video system which includes a video display device, user operable input devices and a system controller which is responsive to said user operable input devices and outputs video image signals for driving said display device, said apparatus comprising:
   a memory for the storage of alternative image signals for display on said video display device;
   a sensing arrangement connectable to said video system for detecting whether said user operable input devices are being operated;
   an interruption controller connected to said sensing arrangement;
   a video switch having a first video input connected, in use, to receive said video signals output by said system controller, a second video input connected, in use, to said alternative image signals from said memory, a video output connected, in use, to said video display device; and
   a control input connected, in use, to receive control signals generated by said interruption controller for selecting a connection of said first, or said second video input to said video output;
   wherein said interruption controller on the detecting an absence of operation of said operable input devices for a time period as determined by a timer, outputs a control signal to said video switch to select said connection of said second video input to said video output for a predetermined interval in order to interrupt said video image signals output by said system controller for said predetermined interval and to substitute the alternative image signals from said memory for display on said video display device.

2. Apparatus as claimed in claim 1 wherein said interruption controller is responsive to operation of said user operable input devices during said predetermined interval to terminate said display of said alternative signals for resuming said display of said video image signals from said system controller.

3. Apparatus as claimed in claim 1 wherein said video system is an amusement machine having a first, attract mode and a second, play mode, and wherein said interruption controller is responsive to at least one signal representative of said amusement machine being in said attract mode, whereby interruption of said video image signals of said system controller by said alternative image signals is restricted to said attract mode of operation of said amusement machine.

4. Apparatus as claimed in claim 1 for a video system which includes a first multiple signal path connector connected to said system controller and a second multiple signal path connector connected to said video display device and to said user operable input devices, said first multiple signal path connector and said second multiple signal path connector being releasable connectable to one another, wherein:
   said apparatus comprises a multiple signal path intermediate connector arranged to be connected to each of said first and second multiple signal path connectors between said first and second multiple signal path connectors for interconnecting respective paths of said first and second connectors; and
   said sensing arrangement includes at least one signal line for sensing a signal on a signal path of said intermediate connector.

5. Apparatus as claimed in claim 4 wherein said signals on a signal path are representative of an operational state of a payment mechanism and/or of user operable devices and/or of indicator lights and/or of an audio output as an indication of a change of mode of operation of said video system.

6. Apparatus as claimed in claim 1, wherein said memory comprises re-writable solid state memory for storage of a plurality of screens of video graphics data, and said interruption controller including means for selecting a screen of video graphics data from said memory for generating said alternative video signals for display.

7. Apparatus as claimed in claim 6 wherein said solid state memory comprises one or more electrically erasable PROM memories.

8. Apparatus as claimed in claim 6 wherein said interruption controller, in use, repeatedly causes interruption of said video image signals from said system controller, said interruption controller causing said display of a selectable number of screens of video data by cycling said screen of video graphics data displayed for successive interruptions, said interrupting controller permitting said display of said video image signals from said system controller for a predetermined period between interruptions.

9. Apparatus as claimed in claim 1 including a unique identifier uniquely identifying a particular apparatus.

10. Apparatus as claimed in claim 9 and further including a programming apparatus including storage of a plurality of screens of video graphics data, said video graphics apparatus and said programming apparatus being provided with mutually cooperating transmission apparatus for permitting said transfer of data from said programming apparatus to said video graphics apparatus, wherein said programming apparatus includes a transmitter for determining said identity of said video graphics apparatus using said unique identifier and being responsive to said identity determination for transmitting selected screens of video graphics data to said video graphics apparatus via said transmission apparatus.

11. A combination as claimed in claim 10 wherein said programming apparatus is a portable unit.

* * * * *